UNITED STATES PATENT OFFICE.

MORDUCH L. KAPLAN, OF BROOKLYN, NEW YORK.

GALVANIC CELL.

1,078,788.   Specification of Letters Patent.   Patented Nov. 18, 1913.

No Drawing.   Application filed June 2, 1913.   Serial No. 771,289.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

The object of the invention is a galvanic cell of the Leclanché type, which, as is well known, contains manganese peroxid as a depolarizing agent. The original Leclanché cell was made up with powdered pyrolusite, but lately there came into use cells containing as the depolarizing agent artificial manganese, hydrated manganese peroxid. These hydrates show a test of about 80% of manganese peroxid, which corresponds approximately to the composition of a monohydrate of the formula $MnO(OH)_2$. The above formula is intended to express the analytical data, but does not give the actual structure of the compounds, as there are many reasons for believing that they are of more complicated nature. Higher hydrated manganese peroxid, or what is the same—hydrates of manganese peroxid of a much lower test than 80%, were not in the market, as there was no practical way of making them, besides nobody expected those compounds to be of any practical use.

I have discovered that manganese carbonate under certain conditions can be oxidized by the action of permanganates to dihydrated manganese peroxid ($MnO_2.2H_2O$) and that this manganese derivative is, notwithstanding its low percentage of active oxygen, an excellent depolarizer. So, for instance, manganese carbonate treated with a highly diluted solution of potassium permanganate at about boiling temperature of water, is changed according to following formula:

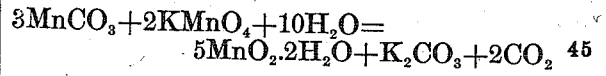
$$3MnCO_3 + 2KMnO_4 + 10H_2O = 5MnO_2.2H_2O + K_2CO_3 + 2CO_2$$

This dihydrated manganese peroxid consists of a fine comparatively dense powder of a grayish blue color and has the characteristic property of being soluble in an excess of diluted oxalic acid solution to a comparatively stable wine red-colored solution, which after long standing becomes discolored depositing colorless needle-shaped crystals. Cells, made up with this dihydrated manganese peroxid as a depolarizer, show 1.8 volt and are superior with respect to yields and recuperative powers.

What I claim as my invention and desire to secure by Letters-Patent, is:

1. A galvanic cell of the Leclanché type containing as a depolarizing agent dihydrated manganese peroxid characterized by consisting of a fine dense powder of grayish blue color.

2. A process of obtaining dihydrated manganese peroxid for use as a depolarizing agent in a galvanic cell comprising oxidizing manganese carbonate by the action of a diluted aqueous solution of an oxidizing agent.

3. A process of obtaining dihydrated manganese peroxid for use as a depolarizing agent in a galvanic cell comprising oxidizing manganese carbonate by a diluted aqueous solution of a permanganate.

Signed at New York city, in the county of New York and State of New York, this 31st day of May A. D. 1913.

MORDUCH L. KAPLAN.

Witnesses:
SAMUEL I. PORTER,
CHARLES C. GILL.